G. BUELNA.
AUTOMATIC BRAKE FOR TALKING MACHINES.
APPLICATION FILED MAY 11, 1908.
911,202.
Patented Feb. 2, 1909.
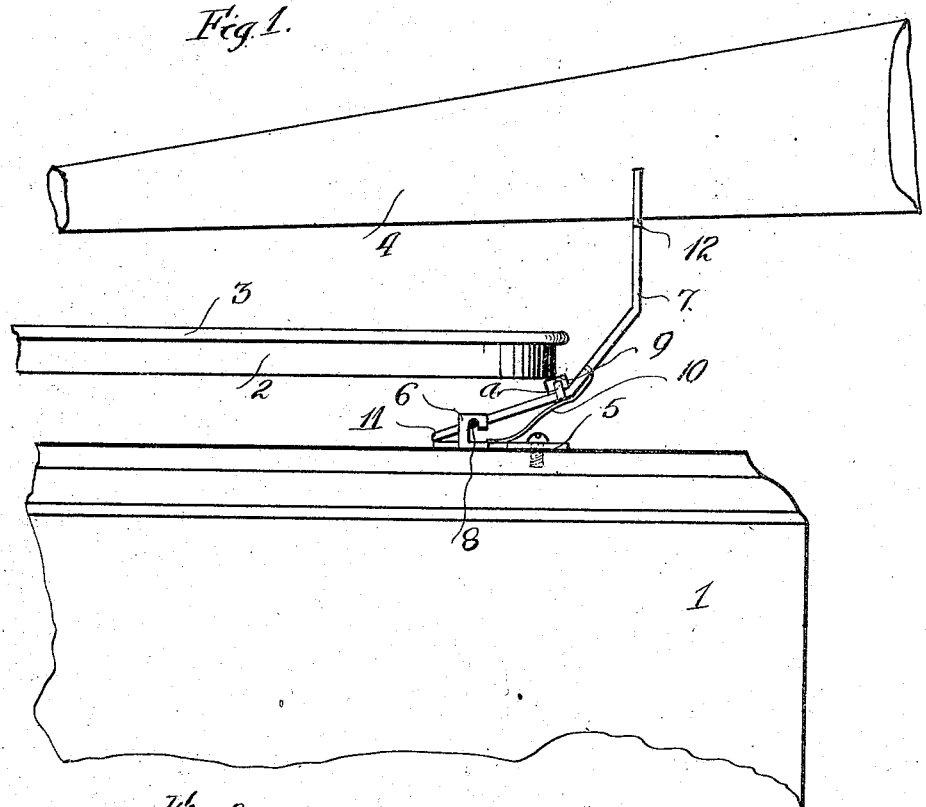
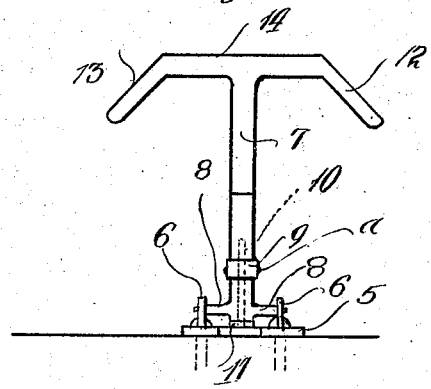
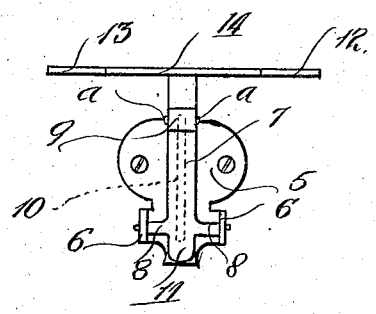

UNITED STATES PATENT OFFICE.

GUADALUPE BUELNA, OF SANTA BARBARA, CALIFORNIA, ASSIGNOR OF ONE-HALF TO ARTHUR E. BURSON, OF SANTA BARBARA, CALIFORNIA.

AUTOMATIC BRAKE FOR TALKING-MACHINES.

No. 911,202.   Specification of Letters Patent.   Patented Feb. 2, 1909.

Application filed May 11, 1908. Serial No. 432,261.

*To all whom it may concern:*

Be it known that I, GUADALUPE BUELNA, a citizen of the United States, residing at Santa Barbara, in the county of Santa Barbara and State of California, have invented certain new and useful Improvements in Automatic Brakes for Talking-Machines, of which the following is a specification.

This invention relates to brakes for talking machines and particularly to that class of brake caused to be actuated automatically by the sound box carrier arms of phonographs.

An object of this invention is to provide a brake, which combines simplicity with efficiency and which is readily and quickly applicable to all talking machines, in avoidance of all necessity for adjustment to the varying sizes of disks now manufactured.

In contradistinction to the brakes now manufactured and used, this invention contemplates the provision of an automatic brake designed to act upon the under surface of the disk carrier periphery. By causing the braking action to be effected in this manner, lateral strains and excessive wear of the elements of a brake are reduced to a minimum if not completely eliminated. Consequently the brake may act with superior velocity without causing the strains by reason of the rotary motion of the disk carrier to be concentrated to one particular point. A brake after the present type not only causes the gentle application of the braking effect, but assists the carrier arm for the sound box to traverse the ungrooved surface of the record previous to the application of the brake which is nearly simultaneous with the completion of the reproduction of the record.

This invention comprises such other features, details of invention and combination of parts as will appear in the accompanying drawing, and then to be more particularly pointed out in the claims.

In the drawing: Figure 1, is a side elevation of the invention as applied. Fig. 2, is a front elevation, and Fig. 3, is a plan view.

Specific reference being had to the drawing, 1. designates the motor containing box of an ordinary talking machine, 2. is a record carrier, 3. a disk record, and 4 a sound box carrier arm of the ordinary type. Upon the box 1 is arranged to be fastened by any suitable means, a plate 5 having two hooks 6 made integral with the plate 5.

7 is a lever provided with arms 8 to engage the hooks 6. This lever is provided with a brake shoe, 9 held on the same by the prehensile tangs *a* provided on the said lever 7. 10 is a spring, one end of which exerts tension against the underside of the lever 7, and the other end of which is in loose engagement with the plate 5, in this manner giving to said lever a position which is normally angular to the parallel axis of the motor containing box 1, thereby causing the brake shoe 9 when free, to act under the pressure of the spring to bear against the outer under periphery of the disk-carrier. A tang 11 is formed contiguous with the said lever 7 at a point beyond the said arms 8, this provision being made to limit the movement of the lever in an upward direction.

The lever 7 terminates in substantially a T, having its respective ends 12 and 13 bent. When the sound-box stylus is placed in the outermost groove of the record preparatory to the reproduction thereof, the sound box carrier arm, depressing the lever 7 releases the brake shoe and leaves the motor free to rotate the disk-carrier. The bend 12 is provided to cause the initial release of the brake as well as to facilitate the travel of the carrier arm onto the flat surface 14 of the T. The movement of the carrier arm onto the said flat surface continues to hold the lever 7 and the brake inoperative until the carrier arm reaches the bend 13, when the lever is free and the spring 10 forces the lever upwardly thereby bringing the brake shoe 9 into speedy and firm engagement with the periphery of the disk carrier, and stopping the rotation of the disk carrier upon the reproduction of a record, irrespective of the size thereof. The bend 13 does not only free the lever, but has a tendency to force the carrier arm towards the center of the record when for any reason the stylus of the sound box does not escape from the last groove of the record.

It will be seen from the above description that the brake is held inoperative and the turntable free to rotate only while the reproducer arm engages the inclined portion 12 and the horizontal portion 14.

What I claim is:

1. The combination of a disk carrier, a support therefor and a sound box carrier arm, with a brake in operative relation to the underside of said disk carrier, said brake controllable by the movement of said sound box carrier arm.

2. A disk carrier, a support therefor, and a sound box carrier arm in combination with the brake lever having a normal contact with the sound box carrier arm during a part of the travel thereof to hold the same inoperative, and means to cause the said lever to escape from the sound box carrier during another part of the travel thereof.

3. A disk carrier, a support therefor, and a sound box carrier arm in combination with a brake lever having a normal contact with the sound box carrier arm during a part of the travel thereof to hold the same inoperative, and an inclined portion on said lever to cause said lever to escape from the sound box carrier during another part of the travel thereof.

4. A disk carrier, a support therefor, and a sound box carrier arm in combination with the brake lever having a normal contact with the sound box carrier arm during a part of the travel thereof to hold the same inoperative, and means carried by said lever to cause said lever to escape from the sound box carrier during another part of the travel thereof.

5. In combination with the disk carrier, a support therefor and a sound box carrier arm, a brake comprising a lever arranged to have normal contact with said carrier arm to hold said brake inoperative during a part of the travel of the said carrier arm, and means to operate said brake to contact with the underside of said disk carrier during another part of the travel of said sound box carrier.

6. A brake for talking machines and the like, comprising a support, a spring actuated lever pivoted in said support, a brake shoe carried by said lever and arranged to engage the underside of the disk carrier of a talking machine, and means on said brake to actuate the brake.

7. A brake for talking machines and the like, comprising a spring actuated lever, a support therefor, said lever having a T-shaped arm to successively hold and release said lever at different times, said lever being actuable by the movement of the sound box carrier of the talking machine.

GUADALUPE BUELNA.

Witnesses:
J. H. BURSON,
J. A. COATES.